Dec. 4, 1951    F. C. WOOLSON ET AL    2,577,061
ACCELERATION RESPONSIVE DEVICE WITH INTEGRATING MEANS
Filed June 29, 1945    3 Sheets-Sheet 1
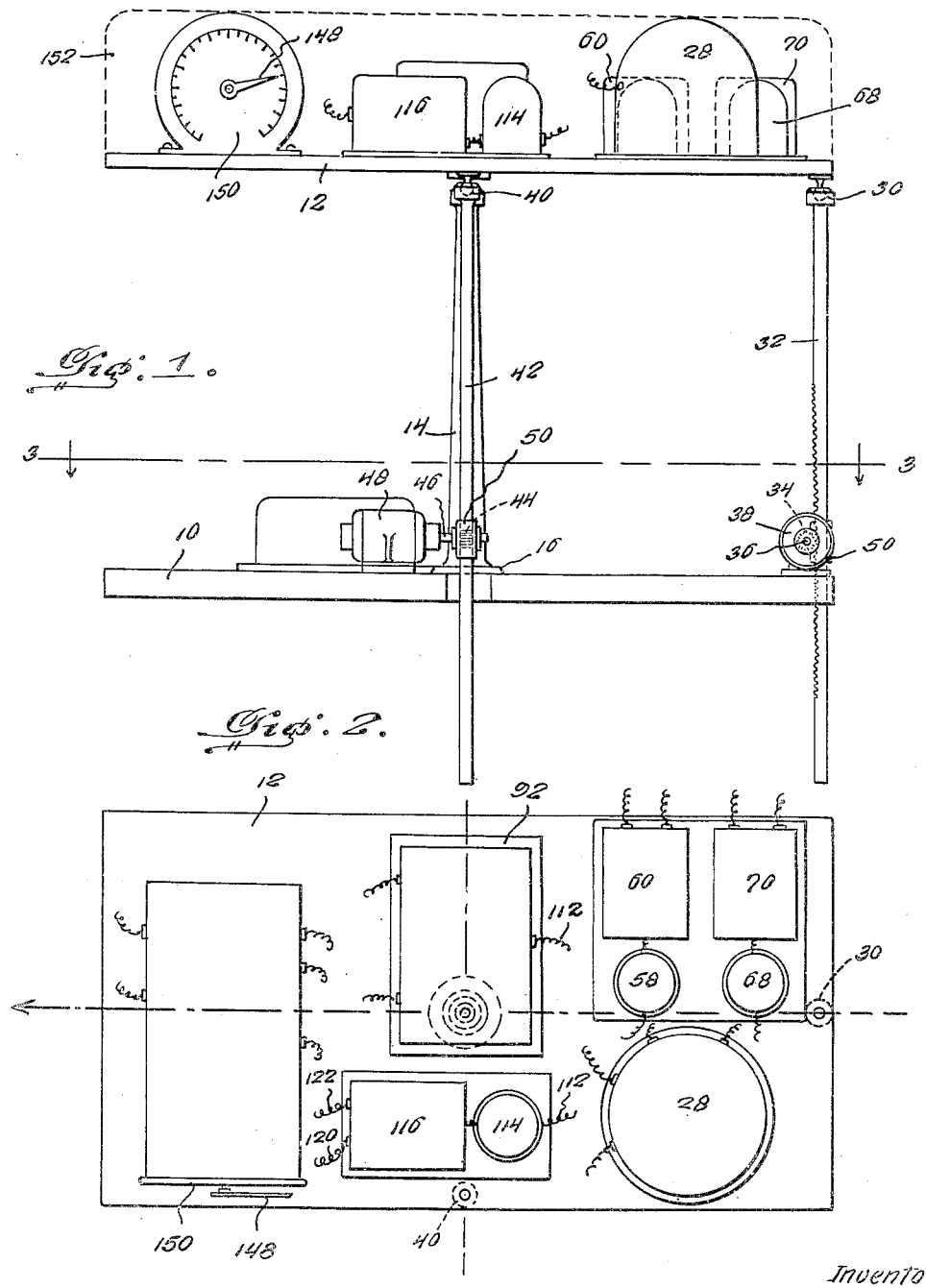

Dec. 4, 1951 F. C. WOOLSON ET AL 2,577,061
ACCELERATION RESPONSIVE DEVICE WITH INTEGRATING MEANS
Filed June 29, 1945 3 Sheets-Sheet 2
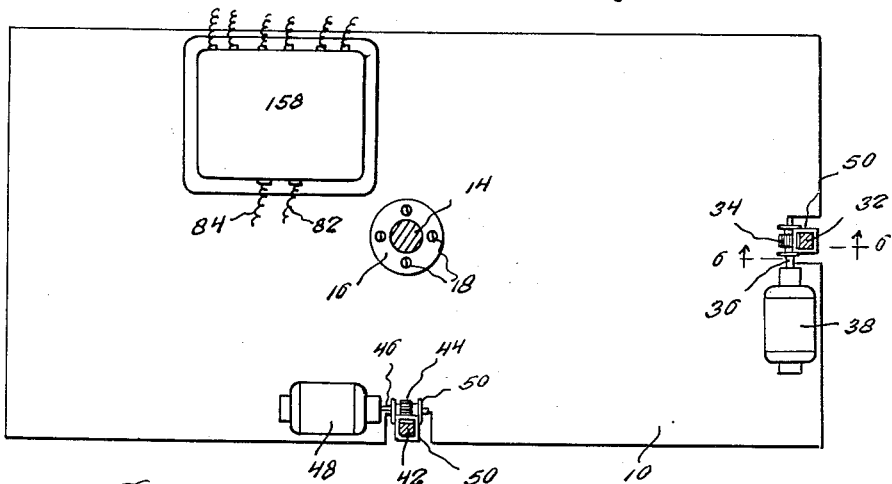
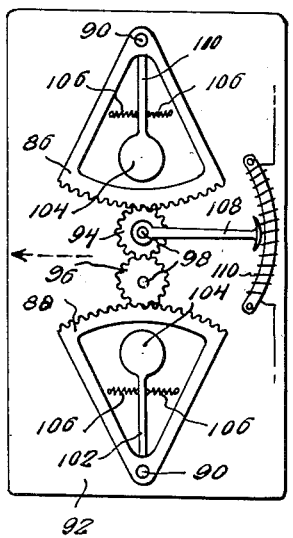
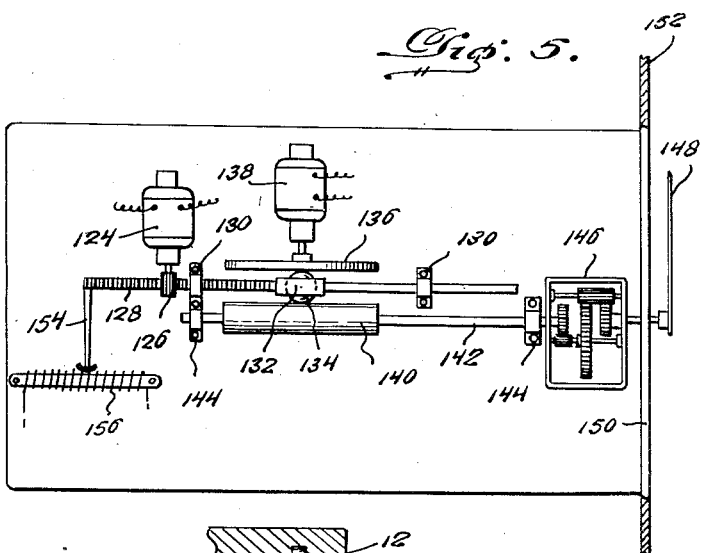
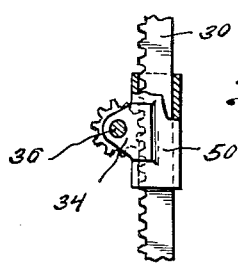
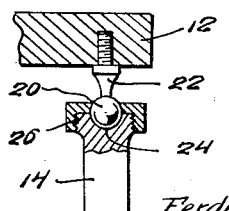
Inventors
Ferdinand C. Woolson
Harold S. Snyder
Roy H. Jacobs
By
Attorneys Patented Dec. 4, 1951

2,577,061

UNITED STATES PATENT OFFICE 2,577,061

ACCELERATION RESPONSIVE DEVICE WITH INTEGRATING MEANS

Ferdinand C. Woolson, Hammonton, N. J., and Harold S. Snyder and Roy H. Jacobs, Langley Field, Va.

Application June 29, 1945, Serial No. 602,250

2 Claims. (Cl. 264—1)

This invention appertains to a ground speed indicator for aircraft, and has for one of its several objects, the provision of an instrumentality of this kind, that is made up of certain well known mechanical and electrical devices, in addition to an electronic signal and balancing system and a gyro controlled leveling system, with said devices and systems so interconnected and co-ordinated as to give a constant, accurate and direct, indication of the ground speed of an airplane in flight.

With this and other objects and advantages in view, the invention resides in the certain new and useful combination, construction, and arrangement of parts and circuits, as will be hereinafter more fully described, set forth in the appended claims, and illustrated in the accompanying drawings, in which:

Figure 1 is a side elevation of a preferred assembly of the indicator parts, in accordance with the invention;

Figure 2 is a top plan view of the leveling instrument table and of certain of the appurtenances mounted thereon;

Figure 3 is a horizontal section, taken through the line 3—3 on Figure 1, showing the base plate in plan, with certain other appurtenances mounted thereon;

Figure 4 is a plan view of the accelerometer or transmitter unit per se;

Figure 5 is a view similar to that of Figure 4, but showing the timing unit per se;

Figure 6 is an enlarged, fragmentary, side elevation, partly in section on the line 6—6 of Figure 3, of one of the instrument table leveling mechanisms;

Figure 7 is a view similar to that of Figure 6, but showing one of the universal joints between the instrument table and its main supporting post, or one of the racks of the leveling mechanisms thereof.

Figure 8:
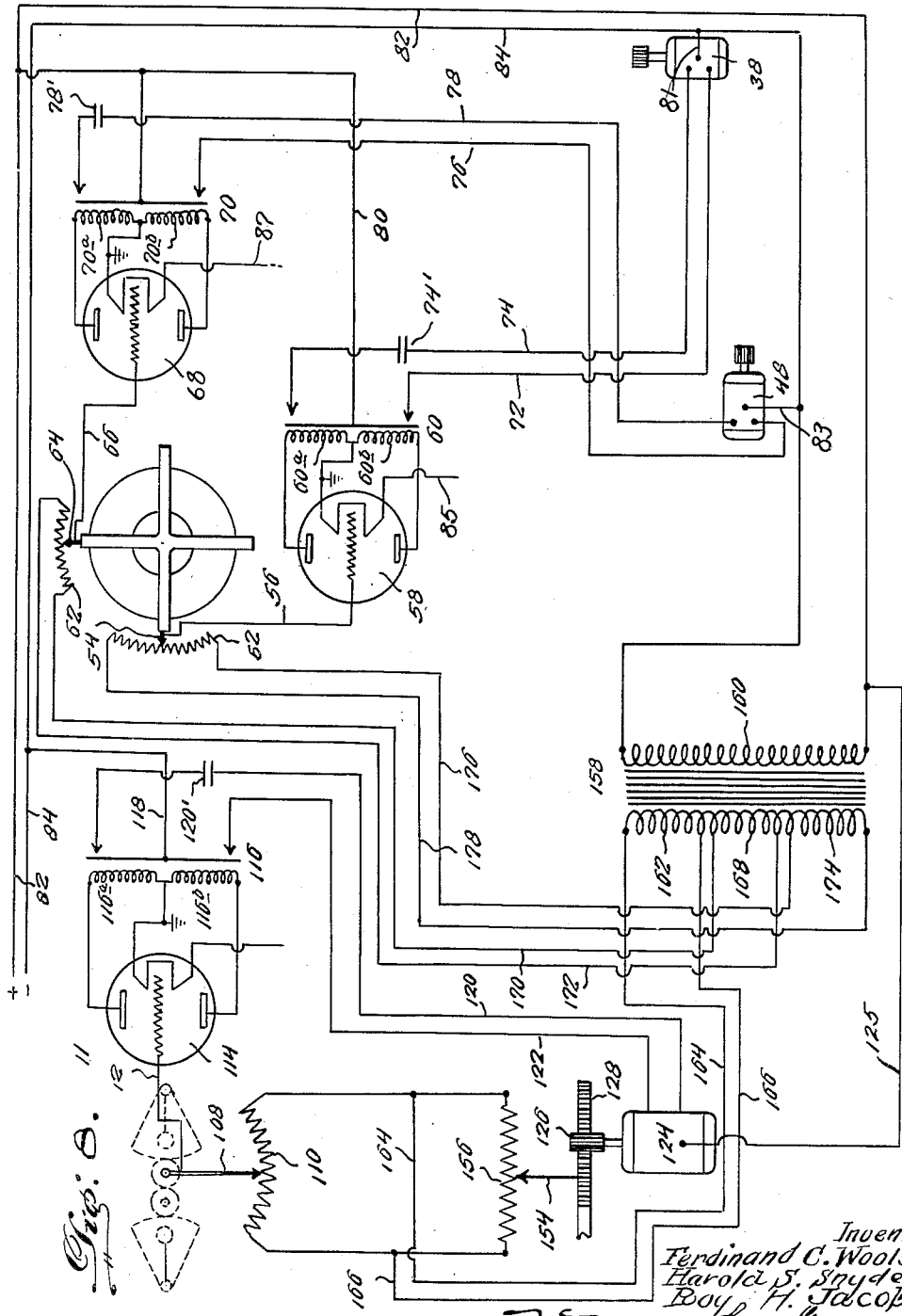
Figure 8 is a diagrammatical view of the circuit connections between the several electrically operated devices and the electronic controls therefor.

Referring in detail to the drawings, wherein like characters of reference denote corresponding parts in the several views, the invention, as it is exemplified therein, is comprised in a base plate 10, to be mounted on the navigator's table (not shown) aboard an airplane, and an instrument table 12, balanced by a gyro and two leveling motors on the top end of a rigid supporting post or standard 14, rising from the center of the base plate, the post or standard having an annular flange 16, at its lower end, secured to the base plate, by means of machine screws or the like 18; a universal connection, in the form of a ball and socket joint, being employed to sustain the instrument table in place. As best shown in Figure 7, the ball 20, of this universal joint, is carried by a stud 22, screw threaded into the lower side of the instrument table 12 at its exact center, and is held engaged in a socket 24, for free rocking movements therein, by means of a retaining element 26, engaged over the ball and screw threaded onto the post end. The base plate 10 and the instrument table 12 are both oblong in plan and are mounted with the longer axes thereof extending parallel to the longitudinal axis of the airplane, and the instrument table is kept level at all times, by means of a gyro 28, mounted on its top side and controlling the operation of two independent leveling mechanisms, one of which acts to compensate for positive and negative angles of pitch, and the other for angles of bank or roll, of the airplane.

One of these leveling mechanisms is comprised in a vertical rack bar 32, having its upper end coupled, by means of a universal joint 30, to the under side of the rear end edge of the instrument table 12, at the center thereof, and its teeth engaged by a pinion 34, keyed on the rotor shaft 36 (Figure 6) of an A. C. reversing motor 38, mounted on the base plate 10; while the other leveling mechanism is likewise comprised in a vertical rack bar 42, having its upper end coupled, by means of a universal joint 40, to the under side of one of the longer side edges of the instrument table, at the center of the same, and its teeth engaged by a pinion 44, keyed on the rotor shaft 46, of another A. C. reversing motor 48. A guide bracket 50 is mounted on the base 10 for each of the rack bars 32 and 42 and also to serve as a support for the end of the rotor shaft of each of the motors 38 and 48.

Fixedly supported adjacent the outer side of the leveling gyro 28, are two potentiometers 52 and 62, one ninety degrees from the other, with respective wipers 54 and 64 mounted on the gyro in the two horizontal axes; the wiper 54 being connected, by a lead 56, to the grid of a duo-triode tube 58 and the wiper 64, by a lead 66, to the grid of a second duo-triode tube 68; the tube 58, together with a double relay 60, and the tube 68, together with a double relay 70, being mounted as independent units on the instrument table 12, substantially as shown in Figure 2. The potentiometers 52 and 62, shown diagrammatically in Figure 8, are positioned in vertical planes with the wipers 54 and 64 thereof extending vertically upward and operating about horizontal axes by the gyro. As shown in Figure 8, the relay 60 has two coils 60a and 60b each connected between a plate and a filament of the duo-triode tube 58, to actuate motor 38. As the table changes from absolute level, the wiper of the potentiometer affected picks up a signal from the potentiometer, transmits the signal to its associated duo-triode tube which discriminates and amplifies the signal, determining to which side of the center the wiper has moved, and then the tube sends a signal to one side of the double relay associated therewith. The relay 70 likewise has two coils 70a and 70b each connected to a plate and a filament of the tube 68, to effect similar control of the motor 48; to which end, the fixed contacts of the relay 60 are connected, by leads 72 and 74, to the terminals of the motor 38, and those of the relay 70, by leads 76 and 78, to the terminals of the motor 48, while one of the terminals of both relays are connected, by a common lead 80, to a current supply line, 82 such as a 115 volt, 400 cycle supply. The respective terminals of the relays are connected to their associated windings of the motors 38 and 48 by the wires 72, 74, 76 and 78, and the common terminals of the motors are connected to the wire 84 by connections 81 and 83. The filaments of each of the tubes 58 and 68 are grounded as shown, and connected in series by the wires 85 and 87 with the two coils of a relay and a 26 volt, D. C. supply (not shown).

Mounted on the instrument table 12, transversely thereof and alongside the tube-relay 60 (Figure 2), is a transmitter, preferably in the form of a simple accelerometer, as best shown in Figure 4, which is comprised in a pair of oppositely disposed sector gears 86 and 88, mounted for horizontal movements on fixed pivots 90, set upright in the base plate 92, and interconnected by a pair of meshing gears 94 and 96, rotatably mounted on stub shafts 98, also set upright in the base plate. Extending from the pivots 90, and radially of the sector gears 94 and 96, are arms 100 and 102, respectively, which each carry a weight 104 at its free end and is held normally centered, relatively to its respective sector gear, by a pair of opposed springs 106, in which centered positions, the arms, the pivots 90, and the stub shafts 98, are aligned in the lateral or roll axis of the airplane. Fixed to the gear 94, for reversed directional motions therewith, is a wiper 108, of a potentiometer 110, supported on the base plate 92, at one side of the transmitter assembly; the wiper being connected by a lead 112 to the grid of a third duo-triode tube 114 which, together with a double relay 116, is mounted as a unit on the instrument table 12, Figure 2. Each of the two coils 116a and 116b, of the relay 116, is connected between a plate and a filament of the tube 114, while the filaments are grounded as shown and connected in series with one another, between a point of common connection with the relay coils and a 26 volt, D. C. current supply. Here, however, the movable contacts of the relay 116 are commonly connected, by a lead 118, to the supply line lead 84.

Also mounted on the instrument table 12, is a timing mechanism, which includes a two phase, A. C. reversing motor 124, controlled from the relay 116, through leads 120 and 122, from the fixed contacts thereof. The common terminal of the motor is connected by a wire 125 to the current supply circuit 82. The motor 124 is geared, as at 126, to a rack-bar 128, mounted for reciprocating motion in brackets 130, secured to the instrument table 12. The rack-bar 128 is provided with a yoke 132, at a point intermediate its ends, and is engaged about a ball 134, which is disposed between and in rolling contact with a disc 136 and a roller 140; the disc being keyed on the rotor shaft of a constant speed, D. C. motor 138 and the roller 140 on a shaft 142, extending parallel to the rack-bar and mounted in bearing brackets 144, also secured to the instrument table 12. The shaft 142 is coupled, through a reduction gear 146, to a pointer 148, which is movable over a dial 150, set in an opening formed in a side wall of a cover 152, carried by the instrument table and enclosing the devices assembled thereon. Carried by the rack-bar 128, is a wiper 154, of a potentiometer 156 (Figure 5), which, as shown in Figure 8, is connected in parallel with the potentiometer 110, to form therewith a simple balanced bridge, for purposes which will presently be fully explained.

Mounted on the base plate 10, is a power pack 158 (Figure 3), which has its primary winding 160, as shown in Figure 8, connected to the 400 cycle, 115 volt, A. C. supply line, by the leads 82 and 84. Leading from a section 162, of the secondary winding of the power transformer 158, are conductors 164 and 166 which connect with the opposite sides of the bridging circuit between the potentiometers 110 and 156, and from the middle section 168 are conductors 170 and 172 that connect with the potentiometer 64, while from the third section 174 are conductors 176 and 178 in connection with the potentiometer 52; the voltage output of each of the secondary sections 162, 168, and 174, preferably being 40 volts.

In the operation of the indicator thus provided, and with the several devices and mechanisms on the instrument table 12 accurately positioned to give perfect balance to the table on the central support 14, any change of the table from absolute level will, by the gyro 28 acting through the wipers 54 and 64, transmit a signal by the respective potentiometers 52 and 62 and pass it to the associated tubes 58 and 68. The signal is discriminated by the potentiometer and sent to one side or the other of the respective relays 60 and 70. With the closing of one or the other of the relays, the corresponding motor 38 or 48 is actuated to drive the gear therein in proper direction for the transmission of corrective movement to the table 12, through the associated levelling rack 32 or 42; the direction of motor operation being controlled by the activating of one side or the other of each of the double relays 60 and 70.

The electronic signal and balance system of the apparatus is accomplished by the two potentiometers 110 and 156 connected in a simple bridge, and the difference in the plate potential of the duo-triode tube 114 is influenced by the voltage impressed on the bridge, enabling the tube to discriminate between signals coming from either side of the center of the transmitter potentiometer 110 wherein a motor 124 is actuated in one direction or the other corresponding with the movement of the wiper 108 which is influenced by the weighted segments. The signal picked up by the transmitter wiper 108 goes to the grid of the tube 114, where it is discriminated and amplified and sent to one side of the relay 116, the closing of which, energizes one of the leads 120, 122, to the motor 124. The motor 124 now drives the rack-bar 128 in the respective direction, moving the ball 134 relatively to the disc 136 and the roller 140 and also the wiper 154, relatively to the potentiometer 156, until the original signal from the transmitter potentiometer 110 is balanced out. Any acceleration, or deceleration, of the airplane, causes the matched weighted arms 100, 102, to move on the pivots 90, and the gears transmit this motion to the wiper 108, sliding it in one direction or the other along the potentiometer 110 to pick up an A. C. signal. When static momentum is reached, the arms 100, 102, are centered by the action of the centering springs 106. The D. C. motor 138, when energized, drives the disc 136 and the motion thereof is transferred to the roller 140, by the ball 134, the amount of movement being controlled by the movement of the rack-bar 128 in positioning the ball relatively to the disc. With the rotation of the roller 140, and, consequently, of the shaft 142, movement is imparted to the pointer 148, through the reduction gearing 146, to indicate the ground speed of the airplane on the dial 152. Acceleration rate will determine the amount of movement of the roller 140 and the pointer 148, and, when, as before stated, static momentum is reached, the transmitter wiper 108 will return to the center of the potentiometer 110, and the ball 134 to the center of the disc 136, while the pointer 148 will hold the registered reading on the dial 150, as long as static momentum continues. Deceleration causes an opposite signal from the transmitter potentiometer 110, and a phasing condenser 120' is connected in the circuit lead 120, extending from one side of the relay 116 to the A. C. reversing motor 124, to cause the opposite rotation of the latter and, consequently, like movements of the other parts of the timing mechanism, thus decreasing the reading indicated by the pointer 148, at the dial 150. The maintaining of the instrument table 12 at absolute level, reduces error from gravitational and centrifugal forces to a minimum.

Without further description, it is thought that the disclosed embodiment of the invention presents an important contribution to the list of electrical and mechanical aids, i. e. instrumentalities, heretofore provided to attain efficiency and safety in aircraft navigation, inasmuch as it will accurately register the ground speed of an airplane, as a direct indication; it being evident, also, that the use of the electronic signal and balance system, plus the gyro controlled levelling system, makes for precision and practicability, while the design, construction, and arrangement of parts and devices, makes for compactness and ease in installation. Also, it is to be understood that various changes in design, construction, and arrangement of parts and circuits, to which the disclosed embodiment of the invention is susceptible, may be resorted to, within the limitations to be determined from the scope of the appended claims.

What we claim is:

1. Apparatus for indicating the ground speed of an aircraft comprising a substantially level platform, a weight mounted on said platform for swinging movements to respectively opposite sides of its center position in response to acceleration and deceleration of the airplane, a first potentiometer mounted on said platform and operated by said weight upon swinging movements of the latter, a balancing potentiometer mounted on said platform and electrically connected to said first potentiometer, a constant speed electric motor, an aircraft speed indicator, speed ratio varying mechanism drivingly connecting said constant speed motor to said speed indicator and including a longitudinally movable rack bar operative upon longitudinal movement thereof to change the speed ratio between said constant speed motor and said indicator, a reversible motor drivingly connected to said rack bar, a current direction discriminating relay interposed between said first potentiometer and said reversible motor to operate said reversible motor in respectively opposite directions in response to movements of said first potentiometer by said weight to opposite sides of the center position of said potentiometer, and means drivingly connecting said rack bar to said balancing potentiometer to move said balancing potentiometer in a direction to balance out the relay operating current passed through said first potentiometer and thereby stop said reversible motor when movement of said first potentiometer by said acceleration responsive weight is terminated.

2. Apparatus for indicating the ground speed of an aircraft comprising a substantially level platform, a weight mounted on said platform for swinging movements to respectively opposite sides of its center position in response to acceleration and deceleration of the airplane, a first potentiometer mounted on said platform and operated by said weight upon swinging movements of the latter, a balancing potentiometer mounted on said platform and electrically connected to said first potentiometer, a constant speed electric motor, an aircraft speed indicator, speed ratio varying mechanism drivingly connecting said constant speed motor to said speed indicator and including a longitudinally movable rack bar operative upon longitudinal movement thereof to change the speed ratio between said constant speed motor and said indicator, a reversible motor drivingly connected to said rack bar, a current direction discriminating relay interposed between said first potentiometer and said reversible motor to operate said reversible motor in respectively opposite directions in response to movements of said first potentiometer by said weight to opposite sides of the center position of said potentiometer, and means drivingly connecting said rack bar to said balancing potentiometer to move said balancing potentiometer in a direction to balance out the relay operating current passed through said first potentiometer and thereby stop said reversible motor when movement of said first potentiometer by said acceleration responsive weight is terminated, said speed ratio varying means comprising a disk driven by said constant speed motor, a roller mounted on said shaft and extending substantially diametrically of said disk in spaced relationship thereto, and a ball carried by said rack bar between said disk and said roller and movable toward and away from the center of said disk.

FERDINAND C. WOOLSON.
HAROLD S. SNYDER.
ROY H. JACOBS.

REFERENCES CITED

The following references are of record in the file of this patent:

UNITED STATES PATENTS

| Number | Name | Date |
| --- | --- | --- |
| 1,319,936 | Barus | Oct. 21, 1919 |
| 1,451,923 | Pierce | Apr. 17, 1923 |
| 1,545,812 | Chessin | July 14, 1925 |
| 1,840,001 | Tsujita | Jan. 5, 1932 |
| 1,885,414 | Chessin | Nov. 1, 1932 |
| 2,266,449 | Ullrich | Dec. 16, 1941 |
| 2,338,732 | Nosker | Jan. 11, 1944 |
| 2,371,626 | Kecskemeti | Mar. 20, 1945 |